(12) United States Patent
Law et al.

(10) Patent No.: US 8,751,939 B2
(45) Date of Patent: Jun. 10, 2014

(54) SIDE TAB NAVIGATION AND PAGE VIEWS PERSONALIZATION SYSTEMS AND METHODS

(75) Inventors: Margaret Law, San Francisco, CA (US); Rashmi Channarayapattna, Dublin, CA (US); Jason Ellis, Geneva, IL (US); Anshu Agarwal, San Francisco, CA (US); Xuefeng Wang, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 335 days.

(21) Appl. No.: 13/094,684

(22) Filed: Apr. 26, 2011

(65) Prior Publication Data

US 2011/0296336 A1    Dec. 1, 2011

Related U.S. Application Data

(60) Provisional application No. 61/328,125, filed on Apr. 26, 2010, provisional application No. 61/328,107, filed on Apr. 26, 2010.

(51) Int. Cl.
*G06F 3/00* (2006.01)
*G06F 3/048* (2013.01)

(52) U.S. Cl.
USPC ............ 715/744; 715/747; 715/777; 715/841

(58) Field of Classification Search
USPC ......... 715/777, 744, 747, 776, 810–823, 841, 715/853
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,745,112 A * | 4/1998 | Hirose | 715/769 |
| 5,761,419 A | 6/1998 | Schwartz et al. | |
| 5,819,038 A | 10/1998 | Carleton et al. | |
| 5,821,937 A | 10/1998 | Tonelli et al. | |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Weilun Lo
*Assistant Examiner* — Dino Kujundzic
(74) *Attorney, Agent, or Firm* — Weaver Austin Villeneuve & Sampson LLP

(57) ABSTRACT

Systems and methods for displaying tab elements representing viewable page elements. A set of one or more main tabs are displayed on a first portion of a display, each main tab defining a link to a database object stored in a database. A user selection of a first one of the main tabs is received (e.g., to determine which tab provides default display), and two or more side tabs are displayed in a first, default order on a second portion of the display, each said side tab defining a link to an element or portion of a first object. In certain aspects, a user selection of a new order for the two or more side tabs is received, and thereafter the two or more side tabs are displayed in the new order, and the new order is stored to the database, wherein upon later access of the first object by the user, the two or more side tabs are automatically displayed in the new order.

13 Claims, 14 Drawing Sheets user drags sub-tab over hide container (the container changes color to reinforce it's a drop target and confirm valid drop position)...

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,760,735 B1 * | 7/2004 | Rusche ................................ 1/1 |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,194,695 B1 * | 3/2007 | Racine et al. ................. 715/763 |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,444,597 B2 * | 10/2008 | Perantatos et al. ............ 715/769 |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 8,365,084 B1 * | 1/2013 | Lin et al. ........................ 715/769 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0177784 A1 * | 8/2005 | Andrews et al. ............... 715/764 |
| 2006/0036568 A1 * | 2/2006 | Moore et al. ..................... 707/1 |
| 2006/0206834 A1 * | 9/2006 | Fisher et al. ................... 715/777 |
| 2008/0077613 A1 * | 3/2008 | Hay et al. ................. 707/103 R |
| 2009/0063415 A1 | 3/2009 | Chatfield et al. |
| 2012/0290407 A1 | 11/2012 | Hubbard et al. |

* cited by examiner

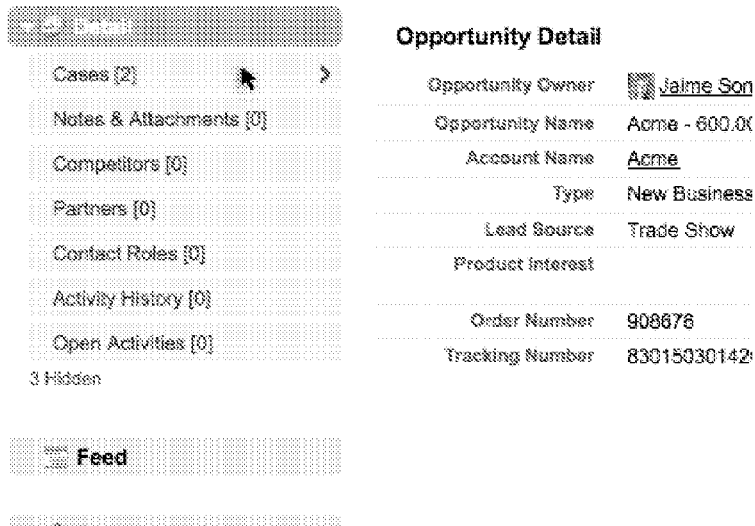
FIG. 8: User hovers over the Cases sub-tab...
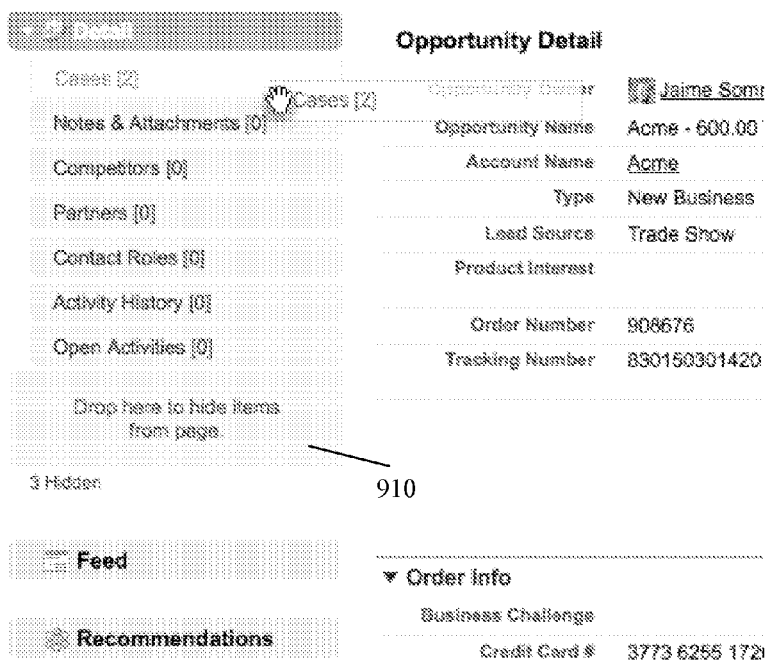
FIG. 9: ...begins dragging it, at which point the hide container appears at the bottom of the list...

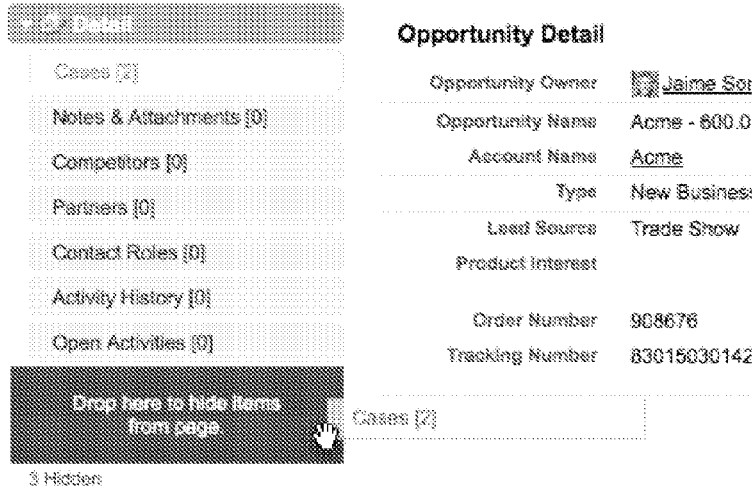
FIG. 10: ...user drags sub-tab over hide container (the container changes color to reinforce it's a drop target and confirm valid drop position)...
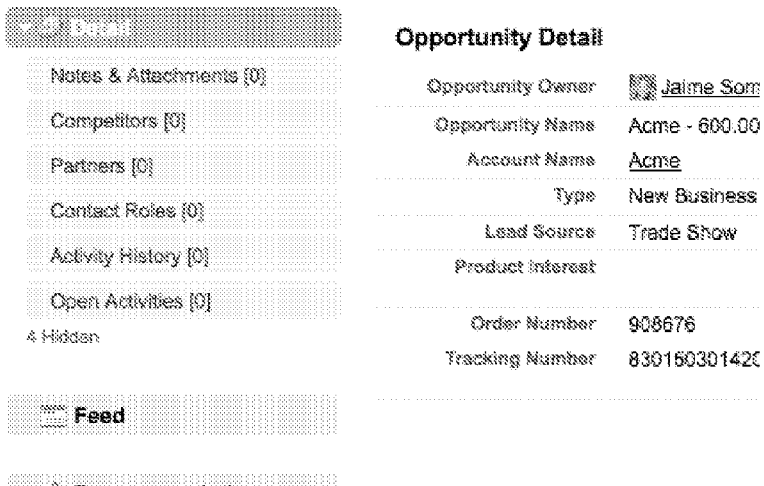
FIG. 11: ...when user drops sub-tab over hide container: Cases sub-tab disappears from side navigation bar, corresponding Cases related list disappears from page, the hide container closes/disappears.

Opportunity Detail [Edit]

| | |
|---|---|
| Opportunity Owner | Jaime Sommers [C |
| Opportunity Name | Acme - 600.00 Widget |
| Account Name | Acme |
| Type | New Business |
| Lead Source | Trade Show |
| Product Interest | |
| Order Number | 908676 |
| Tracking Number | 830150301420 |

Notes & Attachments [0]
Competitors [0]
Partners [0]
Contact Roles [0]
Activity History [0]
Open Activities [0]

4 Hidden
To show hidden items, drag back to list above.

Cases
Products
Stage History
Sales Team

▼ Order Info
  Business Challenge
  Credit Card #   3773 6255 1726 6399
  Exp. Month      4/2010
  PO #            37726

▼ System Information

Feed

Recommendations

SIDE TAB NAVIGATION AND PAGE VIEWS PERSONALIZATION SYSTEMS AND METHODS

CROSS-REFERENCES TO RELATED APPLICATIONS

This application claims the benefit of U.S. Provisional Application Ser. No. 61/328,107, filed Apr. 26, 2010 and U.S. Provisional Application Ser. No. 61/328,125, filed Apr. 26, 2010, the disclosures of which are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to displaying data, and more particularly to configurable user interface displays for use with data accessible via an on-demand database and/or application service.

In current display technologies for displaying database objects, a user is often provided with a set display of preselected fields for a displayed object or record. The displayed set of fields is typically set by an administrative user. An end user may have some flexibility in adjusting the display, but generally this is limited to selecting, on a recurring basis, which fields may be displayed. In general there are no mechanisms that allow a user to specify object display highlighting characteristics such as which fields are to be displayed, and in which order, in a prominent manner.

It is desirable to provide systems and methods that allow for personalized highlighting of certain selected object fields in a consistent and persistent, yet adjustable, manner.

SUMMARY

The present invention relates generally to displaying data. More particularly, embodiments of the present invention relates to user interface displays, and to configurable user interface displays using side tab navigation tools for use with data accessible via an on-demand database and/or application service. In various embodiments, methods for practicing techniques of the present invention, systems having elements or components configured to implement techniques of the present invention, devices, and computer-readable storage media storing executable code and/or instructions are disclosed.

According to one embodiment, a computer-implemented method is provided for displaying tab elements representing viewable page elements. The method typically includes displaying a set of one or more main tabs on a first portion of a display, each main tab defining a link to a database object stored in a database, receiving a user selection of a first one of the main tabs (e.g., to determine which tab provides default display), and displaying two or more side tabs in a first, default order on a second portion of the display, each said side tab defining a link to an element or portion of a first object. The method also typically includes receiving a user selection of a new order for the two or more side tabs, and thereafter displaying the two or more side tabs in said new order, and storing said new order to the database, wherein upon later access of the first object by the user, the two or more side tabs are automatically displayed in said new order.

According to another embodiment, a tangible computer readable medium is provided that stores code, which when executed by one or more processors causes the processor(s) to display a set of one or more main tabs on a first portion of a display, each main tab defining a link to a database object stored in a database, receive a user selection of a first one of the main tabs, and display two or more side tabs in a first, default order on a second portion of the display, each said side tab defining a link to an element or portion of a first object. The code also typically causes the processor to receive a user selection of a new order for the two or more side tabs, and thereafter display the two or more side tabs in said new order, and store said new order to the database, wherein upon later access of the first object by the user, the two or more side tabs are automatically displayed in said new order.

According to yet another embodiment, a database system is provided that typically includes a database that stores database objects, and a computer system communicably coupled to the database, the computer system including a memory that stores code. When executed by a processor of the computer system, the code causes the processor to display a set of one or more main tabs on a first portion of a display, each main tab defining a link to a database object stored in the database, receive a user selection of a first one of the main tabs, and display two or more side tabs in a first, default order on a second portion of the display, each said side tab defining a link to an element or portion of a first object. The code also typically causes the processor to receive a user selection of a new order for the two or more side tabs, and thereafter display the two or more side tabs in said new order, and store said new order to the database, wherein upon later access of the first object by the user, the two or more side tabs are automatically displayed in said new order.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 6 shows a user dragging the Cases sub-tab to the first position in the set of sub-tabs, and FIG. 7 shows the result is an instantly revised related list ordering on the page, without a full page refresh.

FIGS. 8-11 show a step-by-step interaction for hiding sub tabs according to one embodiment.

FIG. 14 shows a way a user can unhide a related list from the page, using drag and drop.

FIG. 15 shows the end result of a user moving Cases to the visible sub-tabs stack, in this case in the $4^{th}$ list position.

FIG. 16 shows moving multiple (consecutive or non-consecutive) sub-tabs together into the hidden sub-tabs container.

DETAILED DESCRIPTION

The present invention provides systems and methods for displaying data, and more particularly configurable user interface displays using side tab navigation tools for use with displaying data accessible via an on-demand multi-tenant database and/or application service.

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the term query plan refers to a set of steps used to access information in a database system.

System Overview

Figure 1:
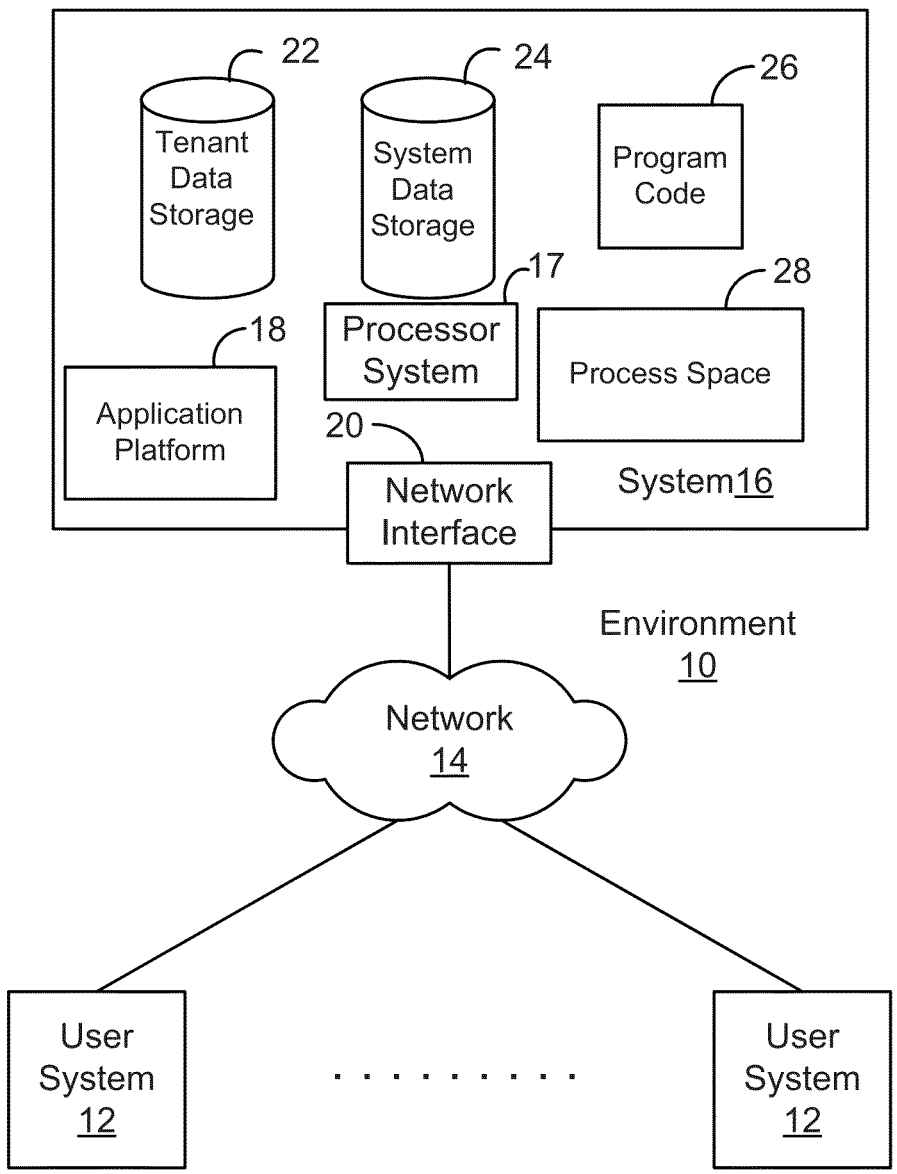
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
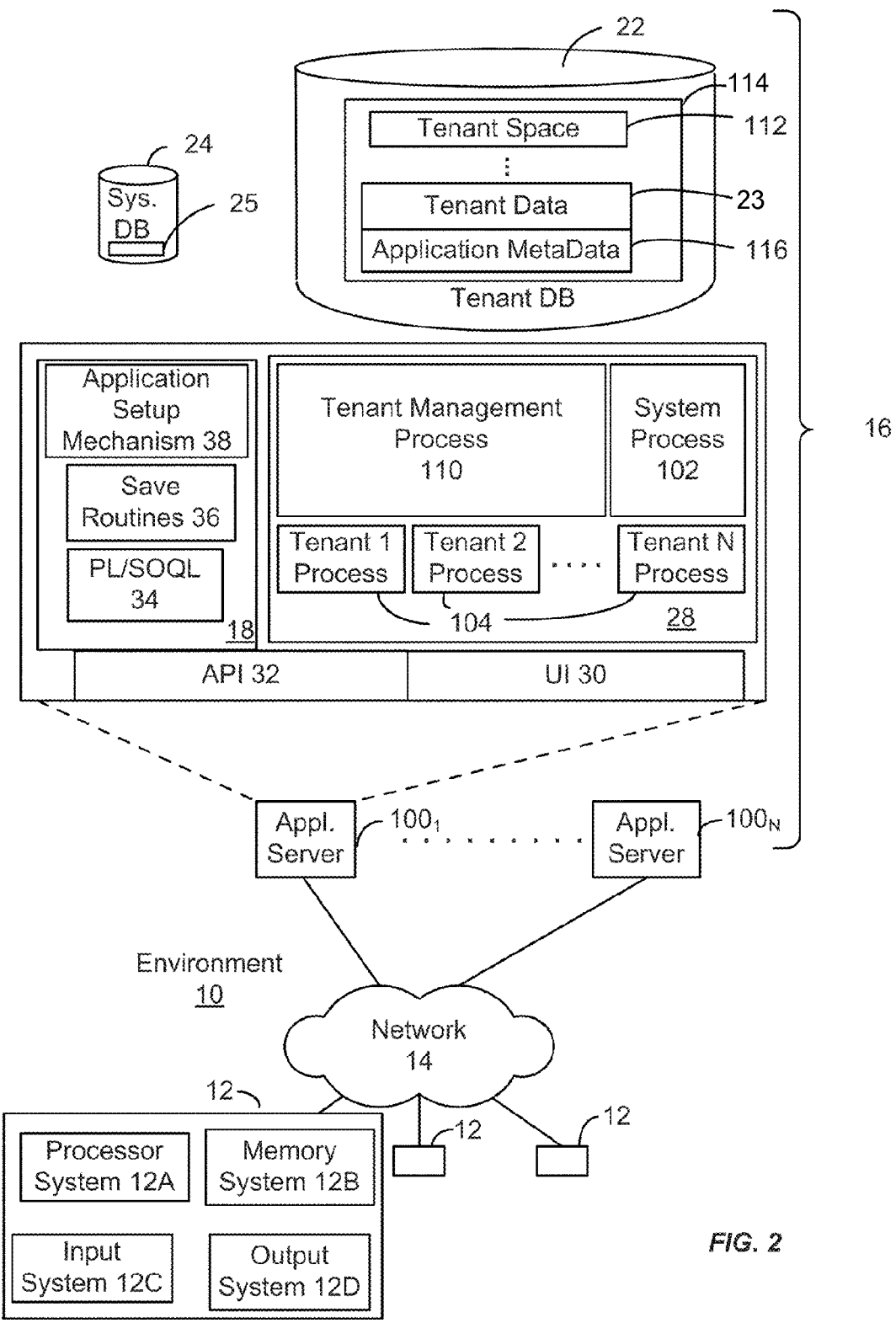
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multitenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System," and which is hereby incorporated herein by reference, teaches systems and methods for creating custom objects as well as customizing standard objects in a multi-tenant database system.

In general, it is desirable to provide systems and methods that allow users to configure the display layout or page view of data to be displayed. Accordingly, in one embodiment, side tab navigation tools are provided that allow users to drag and drop representations of page elements to new locations, and into or out of a section designated for elements to be hidden from the page. Additionally, "jump links" and "flyout previews" afford quick access to page content in some embodiments.

Side Tab Navigation

Figure 3A:
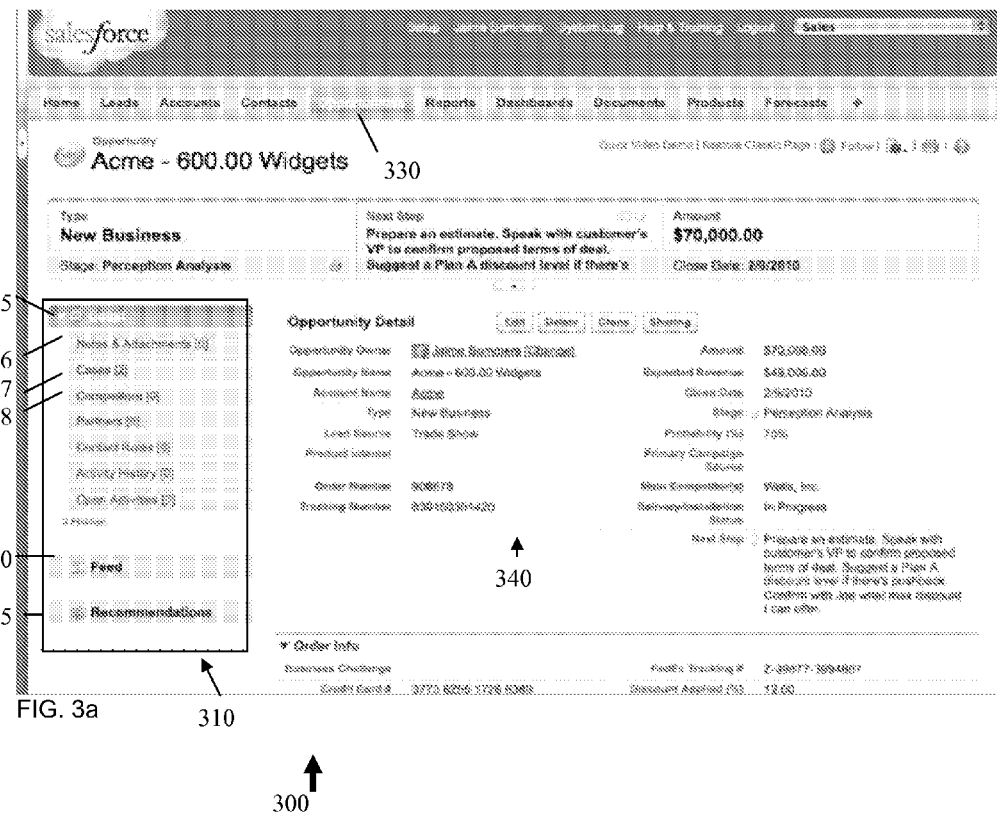
FIG. 3a illustrates an example of a side tab navigation tool on User Interface page according to one embodiment.
Figure 3B:
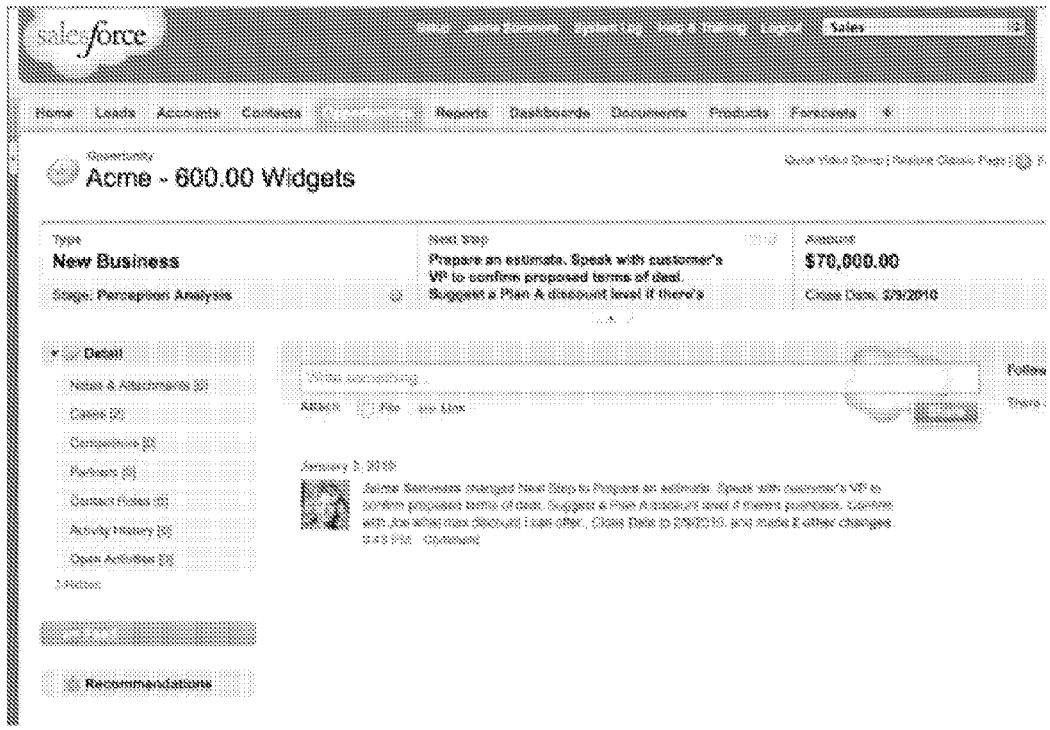
FIG. 3b shows that the Feed side tab is selected and information regarding opportunity feeds is displayed in a region of the UI page.
Figure 3C:
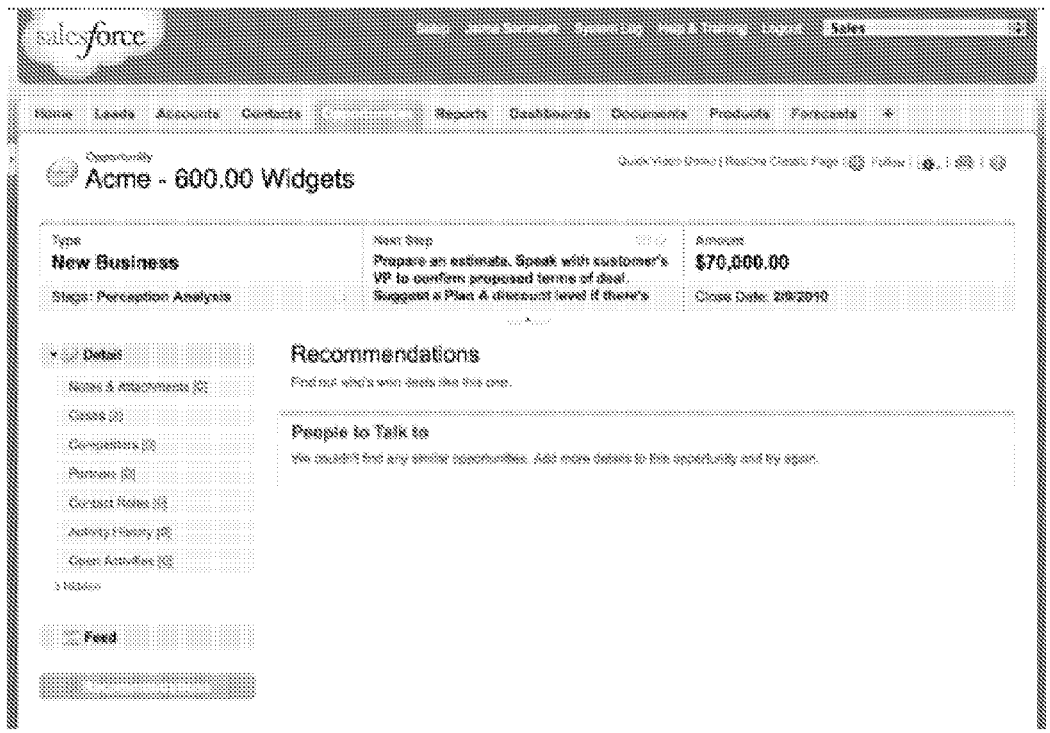
FIG. 3c shows that the Recommendations side tab is selected and information regarding recommendations is displayed in a region of the UI page

According to one embodiment, a side tab navigation tool is provided to allow users to navigate to different parts of a data record and personalize the organization of certain aspects of displayed views of records. FIG. 3*a* illustrates an example of a side tab navigation tab tool 310 (shown in rectangular box) on User Interface page 300 according to one embodiment. In one embodiment, side tab navigation tool 310 contains one or more "side tab" display bars (e.g., Detail tab 315, Feed tab 320, and Recommendations tab 325) and "sub-tab" display bars (e.g., Notes & Attachments sub-tab 316, Cases sub-tab 317, Competitors sub-tab 318, etc.) as shown in FIG. 3*a*. In general, tabs (including sub tabs and side tabs) allow access to stored data. In certain aspects, upon selection of a side tab by a user, the selected side tab is highlighted or otherwise prominently displayed. In certain aspects, the selected side tab (and corresponding sub tabs) are highlighted using the corresponding record object's color (user configurable). For example, if the main Opportunities tab 330 is initially selected, and then the Detail side tab 315 is selected, the Details side tab and all sub tabs (e.g. sub tabs 316, 317, 318, etc) are highlighted in the same manner or in the same color as the main tab 330 (e.g., yellow-orange for the Opportunity object). The selected state determines what content is displayed in the panel 340 to the right of the side navigation tool 310. All other regions of the page remain unchanged. For example, in FIG. 3*a*, the Detail side tab for the main Opportunity tab 330 has been selected (and is highlighted) and stored detail information for the Opportunity object is displayed in region 340 of window 300. In FIG. 3*b*, the Feed side tab 320 has been selected and information regarding opportunity feeds is displayed in region 340 of window 300. Similarly, in FIG. 3*c*, the Recommendations side tab 325 has been selected and stored information about recommendations associated with the Opportunity object is displayed in region 340 of window 300. In certain aspects, sub tabs may be hidden by selection of an element (e.g., triangle toggle) in the corresponding side tab display bar, however, selection of the element (e.g., triangle toggle) of a side tab need not result in selection of the side tab, nor would it result in the hiding of actual related lists on the page.

Figures 4, 5:
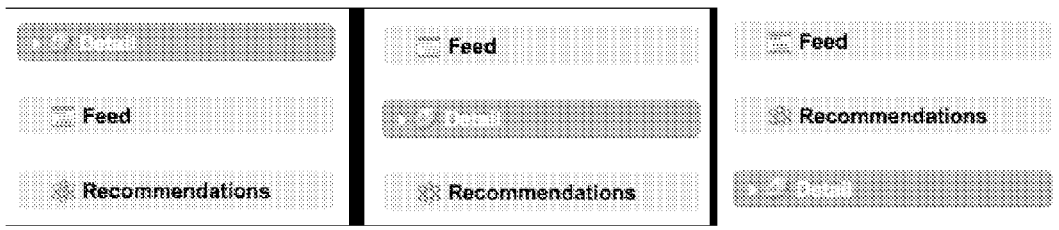
FIG. 4 shows selection of a Detail side tab, demonstrating that the relative position of any side tab may be customized (e.g., via drag and drop functionality).
FIG. 5 shows a sub-tab representation of a related list, and the actual related list to which it corresponds. Selecting (e.g., clicking) this sub-tab repositions page content to bring the related list into focus.

In one embodiment, side tabs can be re-ordered. In certain aspects, a user can drag and drop side tabs to define any order desired. This is a personalization feature; upon selection of an order by a user, the system stores the user's side tab order preferences to the database. In certain aspects, once applied to any given record, the order preference rule is applied to all records of this object type (in this case, all Opportunity records), as viewed by the current user, regardless of underlying record layout. In certain aspects, whichever side tab is in the first position is the one that will be displayed by default when the user first is presented with any record detail page for that object type. FIG. 4 shows three different orderings of the three side tabs of FIG. 3. The Detail side tab is selected in all three examples, as reflected by the color of the displayed side tab bar (inherited from its object type's color; shown as highlighted in the black and white figure), meaning that the user would see Detail-related content to the right in region 340 in all 3 examples. A single click on the Feed side tab in any of these cases would select the Feed side tab, such that its color would change and the content area 340 would display Feed-relevant content.

In certain aspects, sub-tabs, e.g., children of a side tab, are miniature representations of related lists. Sub-tabs have a label and, as shown in square brackets, a record count for that related list (e.g., "Cases [2]" means there are 2 cases related to the current record) as shown in FIG. 5. In certain aspects, sub-tab order exactly reflects related list order on the page in panel 340. In this example shown in FIG. 5, Cases is listed as the second sub-tab (under Notes and Attachments) and appears second in the stack of sub-tabs after the displayed detail information in panel 340.

Figure 6:
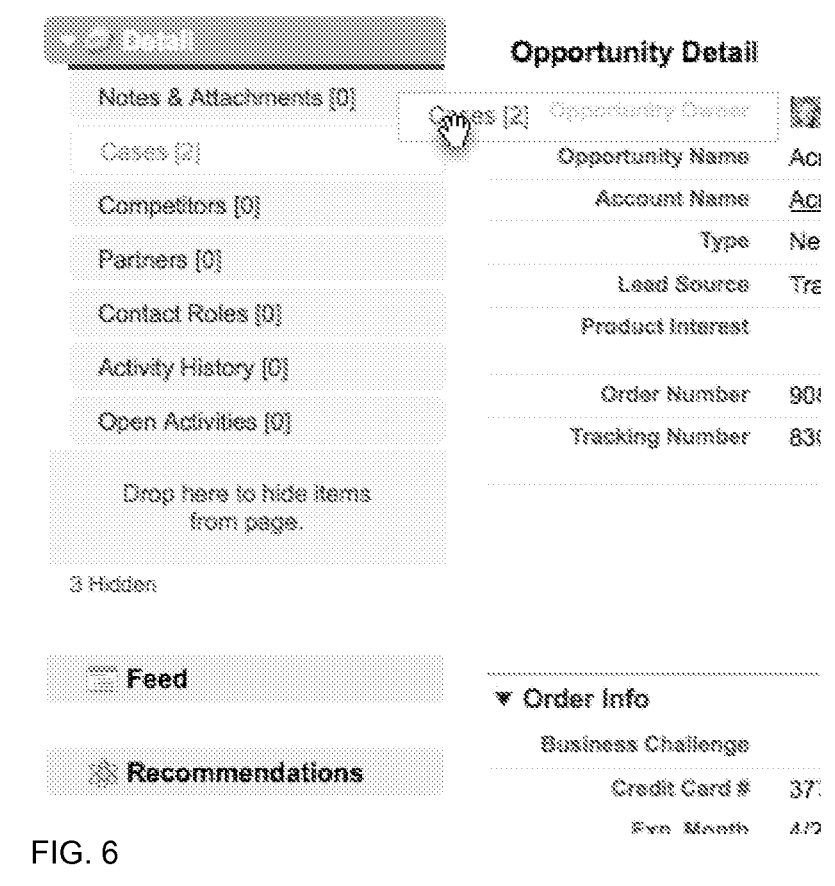
Figure 7:
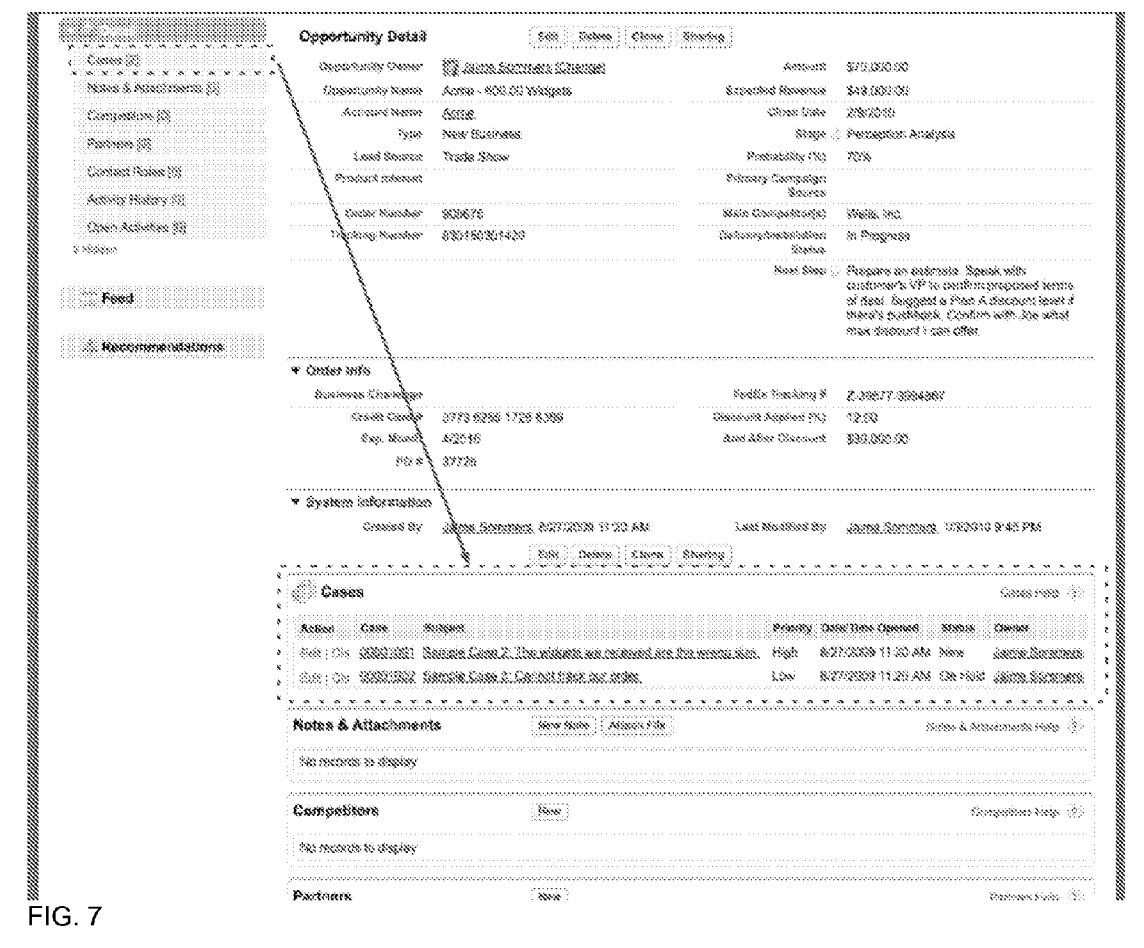

Like side tabs, in certain aspects, sub-tabs can be dragged and dropped to define a new order. This too is a personalization feature. Once applied to a given record, the preference rule is stored to the database and is applied to all records of this object type. However, because different records of a single object type may be displayed using a variety of layouts, with different combinations and orderings of related lists, algorithmic rules for applying rules locally (on a single record/layout) to a global scope (all records/layouts for that object type) for a given user may be applied. (See, e.g., "Page Views Personalization" section below). In the example shown in FIG. 6, the user drags the Cases sub-tab to the first position in the set of sub-tabs and the result is an instantly revised related list ordering on the page, without the need for a full page refresh, as shown in FIG. 7.

In certain aspects, a sub-tab, and its related list counterparts, can be hidden from the record view altogether (like sub-tab reordering, this is also a personalization feature with local-to-global rule application). Dropping a sub-tab into a special container, presented just-in-time as the sub-tab is being dragged, hides the sub-tab from the page in one embodiment. FIGS. 8-11 show a step-by-step interaction for hiding sub tabs according to one embodiment. FIG. 8 shows a user hovering over the Cases sub-tab. FIG. 9 shows the user beginning to drag the Cases sub-tab, at which time a hide container 910 appears at the bottom of the list of sub-tabs. FIG. 10 shows that as the user drags the sub-tab over the hide container 910, the container changes color (or is otherwise prominently highlighted) to show to the user that it is a drop target and to confirm a valid drop position. FIG. 11 shows that when the user drops (releases) the dragged Cases sub-tab over the hide container, the sub-tab disappears from the side navigation bar, and the corresponding Cases related list disappears from the page. The hide container also closes and disappears.

Figure 12:
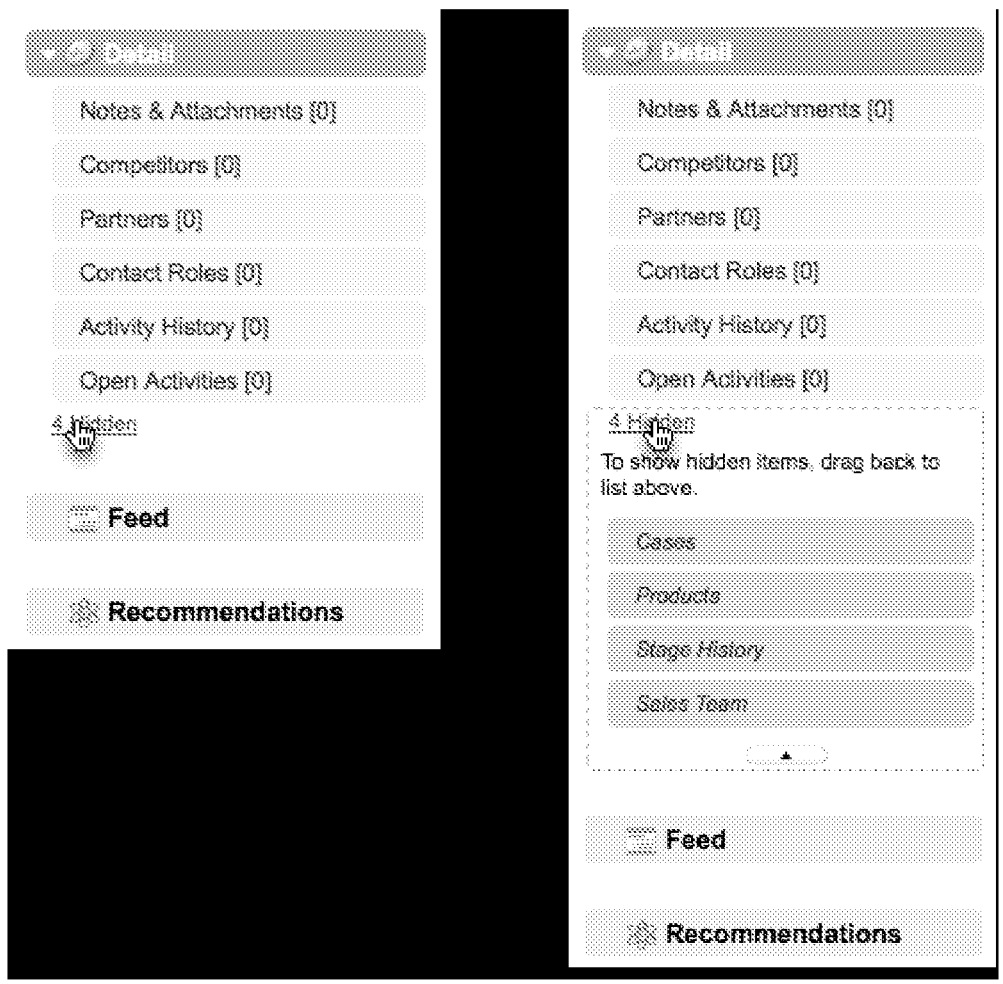
FIG. 12 shows how a user can select (e.g., click on) the link to expand the hidden sub-tabs container, then select it again to collapse the container back down.
Figure 13:
FIG. 13 shows another way to collapse a box by selecting the bottom handle.

When there are hidden related lists on a page, the side navigation tab features a link that displays how many related lists are hidden. In certain aspects, this link also acts as a toggle for opening and closing a box or container that contains hidden sub-tabs. At the beginning of the previous step-by-step example, in FIG. 8, there is a link reading "3 Hidden" just below the stack of sub-tabs. Once the Cases sub-tab has been dragged and dropped into the hide container, the link reads "4 Hidden," as shown in FIG. 11, indicating there are now 4 sub-tabs (and corresponding related lists) currently hidden from the page view. As shown in FIG. 12, a user can select (e.g., click on) the link to expand the hidden sub-tab container, then select it again to collapse it down. Another way to collapse the container is to click the bottom handle as shown in FIG. 13.

Figures 15, 16:
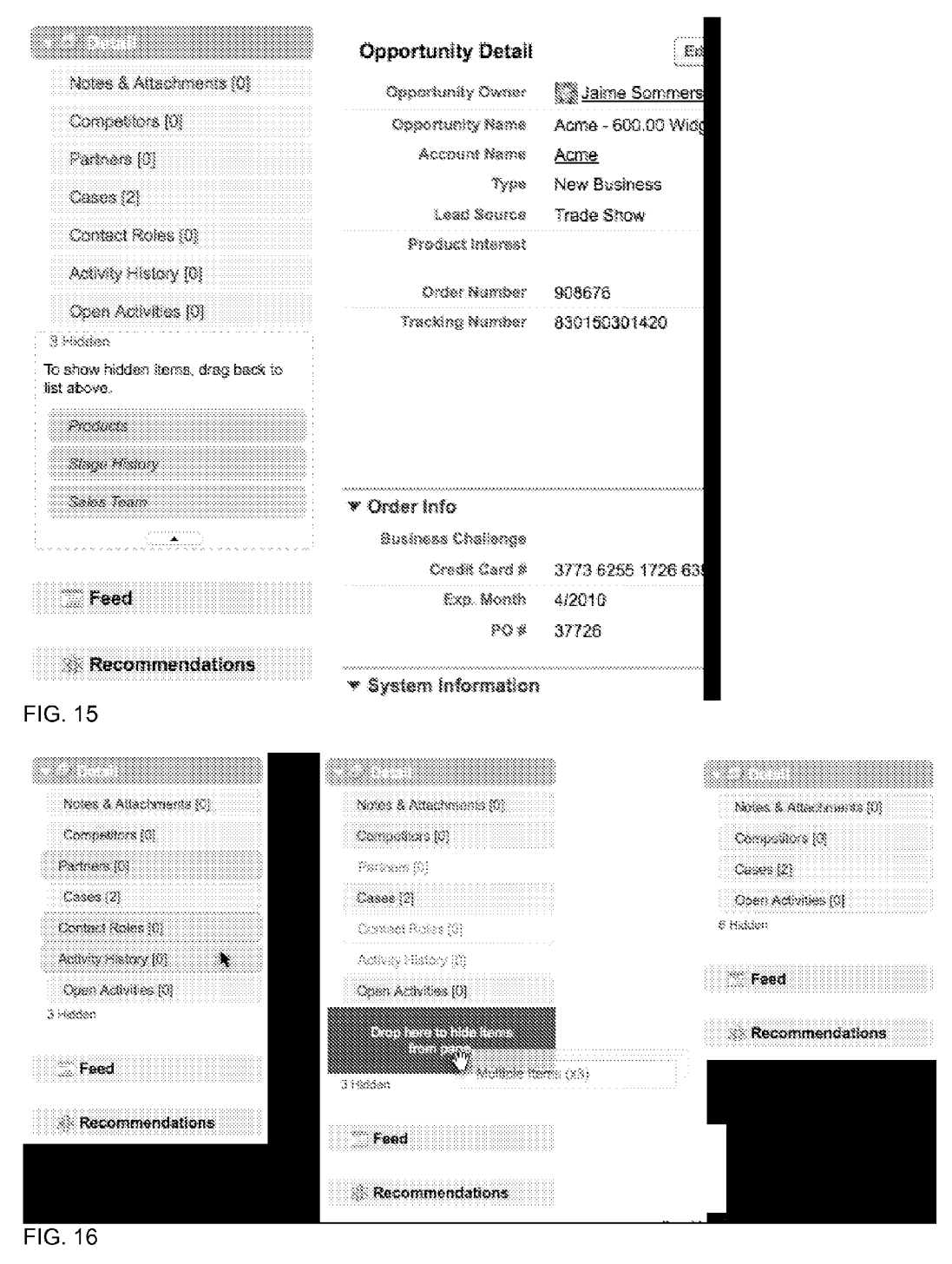

To unhide a related list from the page, a user may drag the list back from the hide container and position it back in the desired position in the visible sub-tabs stack. As shown in FIG. 14, a user is moving Cases to the fourth position in the visible sub-tabs stack, with the end result shown in FIG. 15. In certain aspects, multiple (consecutive or non-consecutive) sub-tabs may be selected and moved together, e.g., using CTRL+click (CMD+click on Mac) or SHIFT+click functionality, as shown in FIG. 16.

Figure 17:
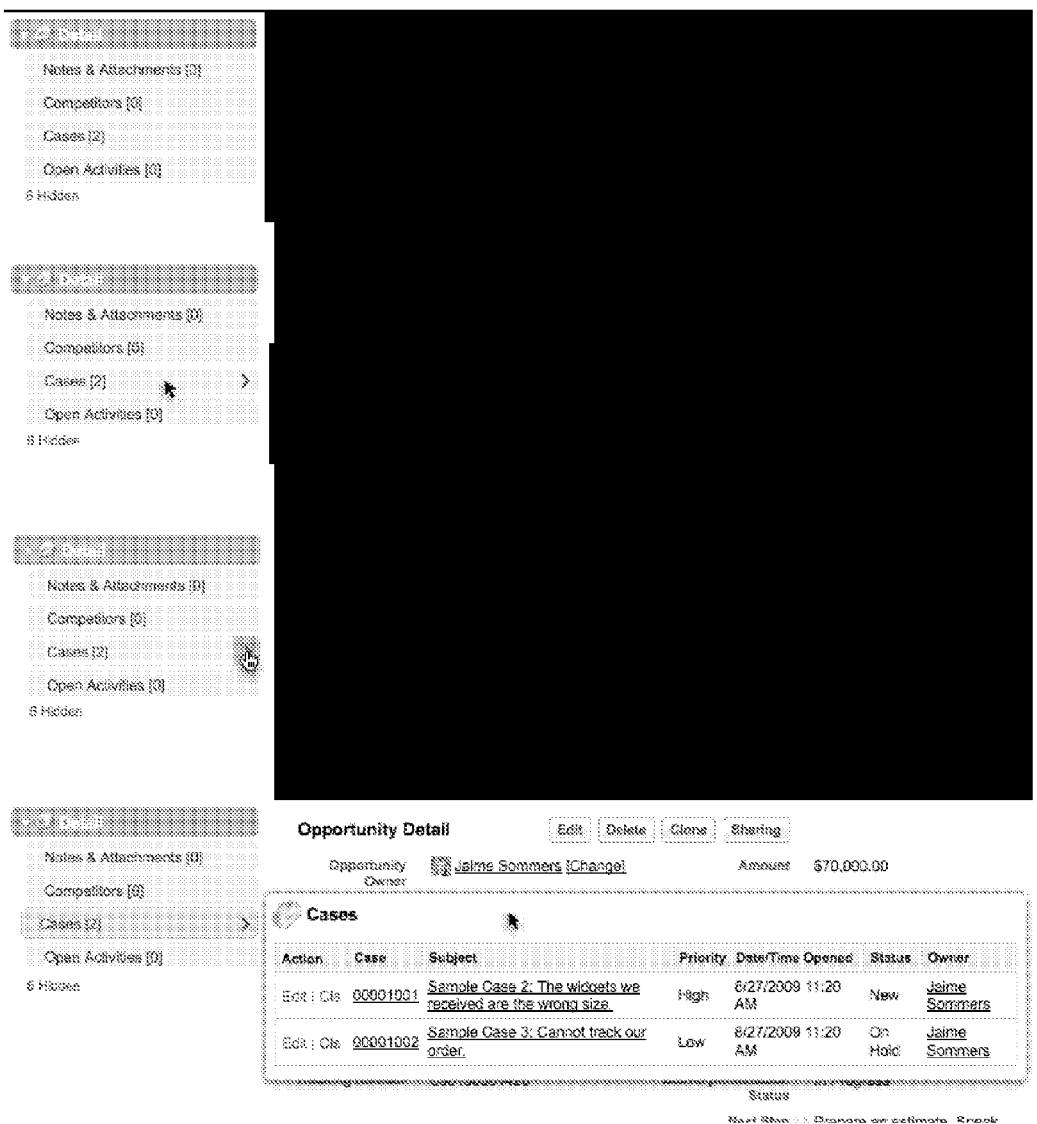
FIG. 17 shows a user using a "flyout" element, which affords a quick way to preview (and even interact with) a related list without scrolling down the page according to one embodiment.

In certain aspects, as shown in FIG. 17, each sub-tab is provided with a "flyout" element, which affords a quick way to preview (and even interact with) a related list without scrolling down the page. Alternately, a user may select, e.g., click on, a sub-tab's link to jump directly to that related list further down the page.

Page Views Personalization

Related List Customization

According to one embodiment, embodiments that enable user-level configuration of related lists in a detail page are provided. A current method presents a user with a global view of all related lists that are visible to the user. This may be more than the related lists the user sees on a single detail page, if the user has multiple layouts mapped to the user via record types. Record types allow the system to present different versions of a detail page for a particular object type to different users, based on their profile definitions, or to the same user, based on other aspects of the business context. Variations might include the inclusion or exclusion of one or more fields, field position within the layout, and so on. In that method, the user is asked to rank all of their related lists in priority order. From then on, when the user views any given record, the related lists on that layout will be shown in that order, while skipping any related lists that aren't on the current layout.

Because it is desirable to allow users to change the order of related lists using direct manipulation, such as through drag and drop directly on the detail page, a method to reconcile this interaction with the existing global customization list is needed.

(Method 1) Incremental customization

In one embodiment, drag and drop functionality is provided to allow the user to drag one or multiple related lists, e.g., using both shift+click and control+click, to allow users to move groups of contiguous and non-contiguous related lists, respectively. When a user drags a related list or group of related lists to a new position within the stack, this information is translated into changes to the global list of related list relative ordering. To accomplish this, the system considers the position of the related list(s) being moved relative to the overall stack (known from here on as the "span", referring to the group's high/low extreme positions within the stack). For each related list in the span, its priority index in the global list is determined. Depending on whether the move was above or below the span, the global priority index of the moved related list(s) is changed to be either immediately above or immediately below the indexes of the span. Depending on the implementation, the numerical definition of "above" and "below" may differ based on whether a larger number index indicates a higher or lower priority. Furthermore, in one aspect, if a user moves a multi-selected group of related lists, they are treated as one contiguous, ordered group when they are re-positioned, regardless of whether they were originally contiguous.

There are multiple ways to implement this, which are dependent on the computing systems involved. In an on-demand model accessed through a web browser, as an example, one embodiment uses a division of responsibilities between the user's interface system in the browser (aka the client) and the server which handles requests and persists changes to the multitenant database. In the incremental customization model, the client browser system translates the user's actions into programmatic calls to the server, which then persists those changes into the global priority list stored in the database.

As an illustration, consider a list of 3 related lists on a given layout, identified from top to bottom (in priority order) as A, B and D. The global priority list is a superset which contains the 4 prioritized related lists A, B, C and D (C exists in the global list because it is on another layout). The user is viewing a record with the aforementioned layout and decides to shift-select B and D and move them above A. The client-side UI determines that B and D are the items to be moved and the "span" that they move across is simply the singleton set of {A}. The client then translates this into a remote method call to the server. In one embodiment, an asynchronous HTTP request is sent to the server with the following parameters:

moved_0=B
moved_1=D
relative_0=A
position=ABOVE

The number of parameters with the "moved" and "relative" prefixes varies according to the number of items moved and the size of the span, respectively. The ordering of the items is indicated by the appended underscore character and zero-based numerical index. While "relative" represents the span, it does not strictly require an indication of the ordering, as their global indexes need to be found in the global list known on the server. The "position" parameter dictates the position of the moved items in relation to the span. The server receives these parameters, looks up the global indexes of the "relative" items, and assigns the new indexes to the "moved" items. One method of performing this operation in a system that uses integer indexes is to temporarily assign decimal indexes to the moved items, resort all items by those indexes, and then reassign new indexes to all items. So in this example, where the global indexes start out as A=1, B=2, C=3, and D=4, the move could temporarily assign B=0.1 and D=0.2, resulting in a reordering of B=0.1, D=0.2, A=1, C=2, which is finally reassigned as B=1, D=2, A=3, C=4.

Another operation is to hide certain items from view, by dragging them to a certain area in the user interface. In one embodiment, this is accomplished on the server by using a separate server call to pass in an unordered list of items to hide. These items are then deleted from the master customization list and the indexes are reassigned to fill in the gaps. To accomplish un-hiding, where the items are dragged back into the list, the previously-described server call may be (re-)used to unhide the elements in the same method as the reordering, where the "moved" parameters are the un-hidden items.

It should be noted that, in a web-based system where a user may have multiple browsers or sessions open, there may be certain views that have an out-of-date representation of the global customization. In this case, any customization requests that are sent from these clients are fulfilled to the best extent possible, and any invalid operations are ignored.

(Method 2) Initial Ordering

Because a user might use drag and drop only, a way to decide on the initial ordering for the master list is needed. For most users who will only be configured to view records through a single layout definition, this is straightforward. For users who may use multiple layout definitions, in one embodiment, a scoring algorithm is used to decide the initial global ordering of the related lists, which is applied "just in time" when the user makes the first drag and drop customization, if no customization already exists.

Appendices A and B illustrate various embodiments and aspects of page views personalization. U.S. Pat. No. 7,774, 366, entitled "Systems and Methods for Implementing Multi-Application Tabs and Tab Sets" discusses aspects of tabs and tab sets, and is hereby incorporated by reference herein for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of displaying tab elements representing viewable page elements, the method comprising:

causing a set of one or more main tabs to be displayed on a first portion of a display, each main tab defining a link to a database object stored in a database;

receiving a user selection of a selected one of the main tabs, the selected main tab defining a link to a selected database object;

causing two or more side tabs to be displayed in a first, default order on a second portion of the display, each of the side tabs defining a link to an element or portion of the selected database object and at least one of the side tabs including two or more sub-tabs, each sub-tab defining a link to one or more child records of the element or the portion of the selected database object linked to by the side tab including the two or more sub-tabs;

receiving a user selection of a new order for the two or more side tabs based on manipulation of at least one of the displayed side tabs responsive to user input and thereafter displaying the two or more side tabs in the new order;

storing the new order to the database in association with information identifying the user, wherein upon later access of the selected database object by the user, the two or more side tabs are automatically displayed in the new order;

causing the two or more sub-tabs to be displayed in a first, default order on the second portion of the display;

causing a hide container to be displayed on the display responsive to receipt of data indicating drag-and-drop manipulation of at least one sub-tab of the two or more sub-tabs responsive to user input;

receiving a user hide selection of the least one of the two or more sub-tabs based on an association of the at least one sub-tab with the hide container in association with the drag-and-drop manipulation of the at least one sub-tab responsive to user input;

storing, in association with the information identifying the user, an indication that the at least one sub-tab should not be displayed;

responsive to receiving the user hide selection, causing the at least one sub-tab to be removed from the display; and causing the hide container to be removed from the display in association with receiving the user hide selection.

2. The method of claim 1, wherein data for the linked element or portion of the selected database object is displayed on a third portion of the display responsive to selection of the side tab defining the link to the element or portion of the selected database object.

3. The method of claim 1, wherein data for the element or portion of the selected database object linked to by the first side tab in the first, default order is displayed on a third portion of the display.

4. The method of claim 1, further comprising:

receiving a user selection of a new order for the two or more sub-tabs;

causing the two or more sub-tabs to be displayed in the new order responsive to receiving the user selection of the new order for the two or more sub-tabs; and storing the new sub-tab order to the database in association with information identifying the user, wherein upon later access of the side tab that includes the two or more sub-tabs by the user, the two or more sub-tabs are automatically displayed in the new order.

5. The method of claim 1, further comprising: displaying a number representing a number of removed sub-tabs represented by the hide container.

6. The method of claim 1, wherein upon selection of the hide container or upon selection of a representation of the hide container, one or more of the removed sub-tabs are displayed in the hide container and are user-selectable.

7. The method of claim 1, further comprising, for each displayed sub-tab, displaying a number representing a number of child records linked to by the corresponding sub-tab.

8. The method of claim 1, wherein:

the hide container is displayed when the drag and drop selection is performed as well as when operations are performed to allow one or more removed sub-tabs in the hide container to be retrieved from the hide container, and wherein the hide container is otherwise not displayed at all or is not displayed and is instead represented by a control or link that, when selected by the user, causes the hide container to be displayed to allow the one or more removed sub-tabs in the hide container to be retrieved.

9. A non-transitory, tangible computer readable medium that stores code, which when executed by one or more processors causes the processor(s) to:
cause a set of one or more main tabs to be displayed on a first portion of a display, each main tab defining a link to a database object stored in a database;
receive a user selection of a selected one of the main tabs, the selected main tab defining a link to a selected database object;
cause two or more side tabs to be displayed in a first, default order on a second portion of the display, each of the side tabs defining a link to an element or portion of the selected database object and at least one of the side tabs including two or more sub-tabs, each sub-tab defining a link to one or more child records of the element or the portion of the selected database object linked to by the side tab including the two or more sub-tabs;
receive a user selection of a new order for the two or more side tabs based on manipulation of at least one of the displayed side tabs responsive to user input and thereafter display the two or more side tabs in the new order;
store the new order to the database in association with information identifying the user, wherein upon later access of the selected database object by the user, the two or more side tabs are automatically displayed in the new order;
cause the two or more sub-tabs to be displayed in a first, default order on the second portion of the display;
cause a hide container to be displayed on the display responsive to receipt of data indicating drag-and-drop manipulation of at least one sub-tab of the two or more sub-tabs responsive to user input;
receive a user hide selection of the least one of the two or more sub-tabs based on an association of the at least one sub-tab with the hide container in association with the drag-and-drop manipulation of the at least one sub-tab responsive to user input;
store, in association with the information identifying the user, an indication that the at least one sub-tab should not be displayed;
responsive to receiving the user hide selection, cause the at least one sub-tab to be removed from the display; and
cause the hide container to be removed from the display in association with receiving the user hide selection.

10. The non-transitory, tangible computer readable medium of claim 9, wherein the code to store the new order includes code to communicate with a remote database to store the new order.

11. The non-transitory, tangible computer readable medium of claim 9, further including code that causes the processor to:
receive a user selection of a new order for the two or more sub-tabs;
display the two or more sub-tabs in the new order responsive to the user selection of the new order for the two or more sub-tabs; and
store the new sub-tab order to the database in association with information identifying the user, wherein upon later access of the side tab that includes the two or more sub-tabs first object by the user, the two or more sub-tabs are automatically displayed in the new order.

12. A database system, comprising:
a database that stores database objects; and
a computer system communicably coupled to the database, the computer system including a memory that stores code, which when executed by a processor of the computer system, causes the processor to:
cause a set of one or more main tabs to be displayed on a first portion of a display, each main tab defining a link to a database object stored in the database;
receive a user selection of a selected one of the main tabs, the selected main tab defining a link to a selected database object;
cause two or more side tabs to be displayed in a first, default order on a second portion of the display, each of the side tabs defining a link to an element or portion of the selected database object and at least one of the side tabs including two or more sub-tabs, each sub-tab defining a link to one or more child records of the element or the portion of the selected database object linked to by the side tab including the two or more sub-tabs;
receive a user selection of a new order for the two or more side tabs based on manipulation of at least one of the displayed side tabs responsive to user input and thereafter display the two or more side tabs in the new order;
store the new order to the database in association with information identifying the user, wherein upon later access of the selected database object by the user, the two or more side tabs are automatically displayed in the new order;
cause the two or more sub-tabs to be displayed in a first, default order on the second portion of the display;
cause a hide container to be displayed on the display responsive to receipt of data indicating drag-and-drop manipulation of at least one sub-tab of the two or more sub-tabs responsive to user input;
receive a user hide selection of the least one of the two or more sub-tabs based on an association of the at least one sub-tab with the hide container in association with the drag-and-drop manipulation of the at least one sub-tab responsive to user input;
store, in association with the information identifying the user, an indication that the at least one sub-tab should not be displayed;
responsive to receiving the user hide selection, cause the at least one sub-tab to be removed from the display; and
cause the hide container to be removed from the display in association with receiving the user hide selection.

13. The database system of claim 12, further including code that causes the processor to:
receive a user selection of a new order for the two or more sub-tabs; and thereafter
cause the two or more sub-tabs to be displayed in the new order responsive to receipt of the user selection of the new order for the two or more sub-tabs; and
store the new sub-tab order to the database in association with information identifying the user, wherein upon later access of the side tab that includes the two or more sub-tabs by the user, the two or more sub-tabs are automatically displayed in the new order.

* * * * *